(12) United States Patent
Nishiyama

(10) Patent No.: US 7,333,497 B2
(45) Date of Patent: Feb. 19, 2008

(54) MOVING PICTURE SERVER AND METHOD OF CONTROLLING SAME

(75) Inventor: Akio Nishiyama, Kobe (JP)

(73) Assignee: FUJIFILM Corporation, Tokyo (JP)

( * ) Notice: Subject to any disclaimer, the term of this patent is extended or adjusted under 35 U.S.C. 154(b) by 582 days.

(21) Appl. No.: 11/016,783

(22) Filed: Dec. 21, 2004

(65) Prior Publication Data

US 2005/0135344 A1   Jun. 23, 2005

(30) Foreign Application Priority Data

Dec. 22, 2003   (JP) .............................. 2003-423921

(51) Int. Cl.
*H04L 12/28* (2006.01)
*H04L 12/56* (2006.01)
*H04L 12/66* (2006.01)

(52) U.S. Cl. .................... 370/395.6; 370/352; 370/401

(58) Field of Classification Search ................ 370/395, 370/401, 352, 230; 709/232, 217, 248, 246, 709/247, 201, 219, 211, 216, 203; 455/414.1, 455/419, 43; 348/460, 461, 69; 725/112, 725/18, 36, 240; 345/87, 74.1, 211; 715/721, 715/716, 719; 375/240

See application file for complete search history.

(56) References Cited

U.S. PATENT DOCUMENTS

| | | | |
|---|---|---|---|
| 5,822,541 A * | 10/1998 | Nonomura et al. ......... | 709/247 |
| 6,851,091 B1 * | 2/2005 | Honda et al. ............... | 715/721 |
| 2002/0007419 A1 * | 1/2002 | Chang et al. ............... | 709/232 |
| 2002/0016818 A1 | 2/2002 | Kirani et al. | |
| 2002/0120693 A1 | 8/2002 | Rudd et al. | |
| 2003/0028647 A1 | 2/2003 | Grosu | |

FOREIGN PATENT DOCUMENTS

| | | |
|---|---|---|
| EP | 0950969 A2 | 10/1999 |
| EP | 1150465 A2 | 10/2001 |
| EP | 1496656 A1 | 1/2005 |
| JP | 2001-359076 A | 12/2001 |
| WO | WO-03/005276 A2 | 1/2003 |
| WO | WO-03/013080 A1 | 2/2003 |

* cited by examiner

*Primary Examiner*—Wing Chan
*Assistant Examiner*—Prenell Jones
(74) *Attorney, Agent, or Firm*—Birch, Stewart, Kolasch & Birch, LLP

(57) ABSTRACT

E-mail to which difference moving picture data is attached is transmitted from a mobile telephone for displaying difference moving pictures to a mail server. The mail server separates the difference moving picture data from the e-mail and transmits it to a moving picture converting server. The moving picture converting server converts the difference moving picture data to complete moving picture data and stores the complete moving picture data in a database. A URL link indicating the storage location in the database is generated by the mail server and transmitted to a mobile telephone for displaying complete moving pictures.

7 Claims, 12 Drawing Sheets

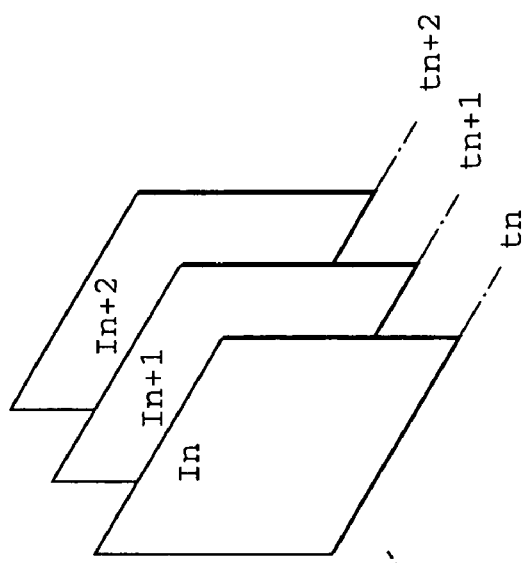
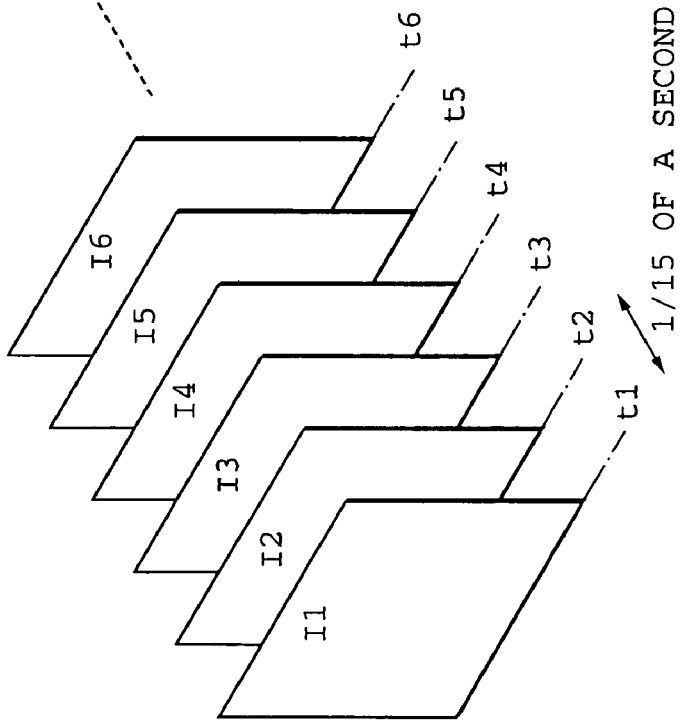
Fig. 2

E-MAIL WITH ATTACHED DIFFERENCE MOVING PICTURE

E-MAIL WITH APPENDED URL

MOVING PICTURE SERVER AND METHOD OF CONTROLLING SAME

BACKGROUND OF THE INVENTION

1. Field of the Invention

This invention relates to a moving picture server and to a method of controlling this server.

2. Description of the Related Art

Mobile telephones now are capable of communicating not only still-picture data but also moving picture data (see the specification of Japanese Patent Application Laid-Open No. 2001-359076).

Moving picture data includes data referred to as "complete moving picture data", such as data based upon animation GIF (Graphics Interchange Format), and "difference moving picture data", such as data based upon MPEG (Motion Picture Experts Group). Complete moving picture data expresses a moving picture by connecting images in which each individual frame constructing the picture is a complete frame. Difference moving picture data deals with images in which complete frames exist at a ratio of one per several frames, and the data represents a difference in motion between a current complete frame and the immediately preceding complete frame.

Many mobile telephones are capable of reproducing moving pictures for enjoyment if the data is complete moving picture data, but some cannot reproduce moving pictures if the data is difference moving picture data.

DISCLOSURE OF THE INVENTION

An object of the present invention is to convert difference moving picture data to complete moving picture data at a suitable timing and transmit the complete moving picture data to a mobile telephone.

According to a first aspect of the present invention, the foregoing object is attained by providing a moving picture server comprising: a generating device (generating means), which responds to receipt of e-mail transmitted from a first mobile terminal to a second mobile terminal and to which difference moving picture data has been attached, for executing processing that generates complete moving picture data from the difference moving picture data, and processing that generates e-mail to which has been appended an address indicating a location at which the generated complete moving picture data will be stored; a complete moving picture data storage controller (complete moving picture data storage control means) for controlling a complete moving picture data storage device in such a manner that the complete moving picture data generated by the generating device will be stored at a location specified by the address; an e-mail transmitting device (e-mail transmitting means) for transmitting the e-mail with the appended address generated by said generating device to the second mobile terminal; and a complete moving picture data transmitting device (complete moving picture data transmitting means), which responds to a moving picture request transmitted from the second mobile terminal in response to receipt at the second mobile terminal of the e-mail with the address that has been transmitted from said e-mail transmitting device, for transmitting the complete moving picture data, which has been stored at the location of the complete moving picture data storage device specified by the address, to the second mobile terminal.

The first aspect of the present invention also provides a control method suited to the moving picture server described above. Specifically, the present invention provides a method of controlling a moving picture server, the method comprising the steps of: in response to receipt of e-mail transmitted from a first mobile terminal to a second mobile terminal and to which difference moving picture data has been attached, executing processing that generates complete moving picture data from the difference moving picture data, and processing that generates e-mail to which has been appended an address indicating a location at which the generated complete moving picture data will be stored; controlling a complete moving picture data storage device in such a manner that the generated complete moving picture data will be stored at a location specified by the address; transmitting the generated e-mail with the appended address to the second mobile terminal; and in response to a moving picture request transmitted from the second mobile terminal in response to receipt at the second mobile terminal of the e-mail with the address that has been transmitted, transmitting the complete moving picture data, which has been stored at the location of the complete moving picture data storage device specified by the address, to the second mobile terminal.

In accordance with the first aspect of the present invention, difference moving picture data is attached to e-mail that is to be transmitted from a first mobile terminal to a second mobile terminal. The e-mail with the attached difference moving picture data is received at a moving picture server, complete moving picture data is generated from the difference moving picture data and the complete moving picture data is stored at a location, which is specified by a certain address, in a complete moving picture data storage device. Further, e-mail to which is appended the address where the complete moving picture data is stored is generated and transmitted to the second mobile terminal.

When the e-mail with the appended address is received at the second mobile terminal, the latter transmits a moving picture request to the moving picture server. When this occurs, the complete moving picture data that has been stored at the location in the complete moving picture data storage device specified by the address is read out and transmitted from the moving picture server to the second mobile terminal. Thus, even if the second mobile terminal can only reproduce a moving picture represented by complete moving picture data, the user of this mobile terminal can enjoy a moving picture represented by difference moving picture data that has been transmitted from the first mobile terminal.

In accordance with the first aspect of the present invention, if e-mail with attached difference moving picture data is received from a first mobile terminal, complete moving picture data is generated from the difference moving picture data regardless of whether or not there is a moving picture request from a second mobile terminal. If a moving picture request is issued from the second mobile terminal, the moving picture data can transmitted to the second mobile terminal immediately. Thus the time from transmission of a moving picture request to display of a moving picture on the second mobile terminal can be shortened.

According to a second aspect of the present invention, the foregoing object is attained by providing a moving picture server comprising: an e-mail generating device (e-mail generating means) for receiving e-mail transmitted from a first mobile terminal to a second mobile terminal and to which difference moving picture data has been attached, and generating e-mail to which has been appended an address indicating a location at which the difference moving picture data will be stored; a difference moving picture data storage controller (difference moving picture data storage control means) for controlling a difference moving picture data storage device in such a manner that the difference moving picture data that has been attached to the received e-mail will be stored at a location specified by the address; an e-mail transmitting device (e-mail transmitting means) for transmitting the e-mail with the appended address generated by said e-mail generating device to the second mobile terminal; a complete moving picture data generating device (complete moving picture data generating means), which responds to a moving picture request transmitted from the second mobile terminal in response to receipt at the second mobile terminal of the e-mail with the address that has been transmitted from said e-mail transmitting device, for generating complete moving picture data from the difference moving picture data that has been stored at the location of the difference moving picture data storage device specified by the address; and a complete moving picture data transmitting device (complete moving picture data transmitting means) for transmitting the complete moving picture data, which has been generated by said complete moving picture data generating device, to the second mobile terminal.

The second aspect of the present invention also provides a control method suited to the moving picture server described above. Specifically, the present invention provides a method of controlling a moving picture server, the method comprising the steps of: receiving e-mail transmitted from a first mobile terminal to a second mobile terminal and to which difference moving picture data has been attached, and generating e-mail to which has been appended an address indicating a location at which the difference moving picture data will be stored; controlling a difference moving picture data storage device in such a manner that the difference moving picture data that has been attached to the received e-mail will be stored at a location specified by the address; transmitting the generated e-mail with the appended address to the second mobile terminal; in response to a moving picture request transmitted from the second mobile terminal in response to receipt at the second mobile terminal of the transmitted e-mail with the address, generating complete moving picture data from the difference moving picture data that has been stored at the location of the difference moving picture data storage device specified by the address; and transmitting the generated complete moving picture data to the second mobile terminal.

In accordance with the second aspect of the present invention, difference moving picture data is attached to e-mail that is to be transmitted from a first mobile terminal to a second mobile terminal. When the e-mail with the attached difference moving picture data is received by a moving picture server, the difference moving picture data is stored at a location of a certain address in a difference moving picture data storage device. The e-mail with this address appended thereto is transmitted from the moving picture server to the second mobile terminal.

When the e-mail with the appended address is received at the second mobile terminal, the latter transmits a moving picture request to the moving picture server. When this occurs, the complete moving picture data is generated from the difference moving picture data that has been stored at the location in the difference moving picture data storage device specified by the address. The generated complete moving picture data is transmitted to the second mobile terminal. Thus, even if the second mobile terminal can only reproduce a moving picture represented by complete moving picture data, the user of this mobile terminal can enjoy a moving picture represented by difference moving picture data that has been transmitted from the first mobile terminal.

In accordance with the second aspect of the present invention, complete moving picture data is generated in response to a moving picture request from the second mobile terminal. Although complete moving picture data usually involves an amount of data greater than that of difference moving picture data, the fact that the complete moving picture data is generated only in response to a request means that the storage capacity of the device that stores the moving picture data can be reduced.

According to a third aspect of the present invention, the foregoing object is attained by providing a moving picture server comprising: a generation-timing decision device (generation-timing decision means) for receiving e-mail transmitted from a first mobile terminal to a second mobile terminal and to which difference moving picture data has been attached, and deciding, based upon the received difference moving picture data, whether to generate complete moving picture data from the difference moving picture data in advance or when a moving picture request transmitted from the second mobile terminal is received; a moving picture data storage controller (moving picture data storage control means), which is responsive to a decision by said generation-timing decision device to the effect that the complete moving picture data is to be generated from the difference moving picture data in advance, for generating the complete moving picture data from the received difference moving picture data and storing the generated complete moving picture data at a location of a moving picture data storage device that has a specific address, and which is responsive to a decision by said generation-timing decision device to the effect that the complete moving picture data is to be generated from the difference moving picture data when the moving picture request is received, for storing the received difference moving picture data at a location of the moving picture data storage device that has a specific address; an e-mail generating device (e-mail generating means) for generating e-mail to which has been appended an address indicating a location of the moving picture data storage device at which the difference moving picture data or complete moving picture data has been stored; an e-mail transmitting device (e-mail transmitting means) for transmitting the e-mail with the appended address generated by said e-mail generating device to the second mobile terminal; and a moving picture data transmitting device, which responds to a moving picture request transmitted from the second mobile terminal in response to receipt at the second mobile terminal of the e-mail with the address that has been transmitted from said e-mail transmitting device, for creating complete moving picture data from difference moving picture data and transmitting the complete moving picture data to the second mobile terminal if the moving picture data that has been stored at the location of the moving picture data storage device specified by the address is this difference moving picture data, and transmitting complete moving picture data to the second mobile terminal if the moving picture data that has been stored at the location of the moving picture data storage device specified by the address is this complete moving picture data.

The third aspect of the present invention also provides a control method suited to the moving picture server described above. Specifically, the present invention provides a method of controlling a moving picture server, the method comprising the steps of: receiving e-mail transmitted from a first mobile terminal to a second mobile terminal and to which difference moving picture data has been attached, and deciding, based upon the received difference moving picture data, whether to generate complete moving picture data from the difference moving picture data in advance or when a moving picture request transmitted from the second mobile terminal is received; generating, in response to a decision to the effect that the complete moving picture data is to be generated from the difference moving picture data in advance, the complete moving picture data from the received difference moving picture data and storing the generated complete moving picture data at a location of a moving picture data storage device that has a specific address, and storing, in response to a decision to the effect that the complete moving picture data is to be generated from the difference moving picture data when the moving picture request is received, the received difference moving picture data at a location of the moving picture data storage device that has a specific address; generating e-mail to which has been appended an address indicating a location of the moving picture data storage device at which the difference moving picture data or complete moving picture data has been stored; transmitting the generated e-mail with the appended address to the second mobile terminal; and in response to a moving picture request transmitted from the second mobile terminal in response to receipt at the second mobile terminal of the transmitted e-mail with the address, creating complete moving picture data from difference moving picture data and transmitting the complete moving picture data to the second mobile terminal if the moving picture data that has been stored at the location of the moving picture data storage device specified by the address is this difference moving picture data, and transmitting complete moving picture data to the second mobile terminal if the moving picture data that has been stored at the location of the moving picture data storage device specified by the address is this complete moving picture data.

In accordance with the third aspect of the present invention, difference moving picture data is attached to e-mail that is to be transmitted from a first mobile terminal to a second mobile terminal. The e-mail with the attached difference moving picture data is received by a moving picture server. Based upon the received difference moving picture data, it is decided whether to generate complete moving picture data from the difference moving picture data in advance or when a moving picture request transmitted from the second mobile terminal has been received. In response to a decision that complete moving picture data is to be generated from difference moving picture data in advance, complete moving picture data is generated from the received difference moving picture data and the generated complete moving picture data is stored at a location having a specific address. In response to a decision that complete moving picture data is to be generated from difference moving picture data in response to a moving picture request, the received difference moving picture data is stored at a location having a specific address. E-mail to which has been appended the address indicating the location at which the difference moving picture data or complete moving picture data has been stored is generated and the generated e-mail with the appended address is transmitted to the second mobile terminal.

In response to a moving picture request transmitted from the second mobile terminal in response to receipt of the transmitted e-mail with the address received by the second mobile terminal, complete moving picture data is created if the moving picture data that has been stored at the location specified by the address is difference moving picture data. The created complete moving picture data is transmitted from the moving picture server to the second mobile terminal. If the moving picture data that has been stored at the location specified by the address is complete moving picture data, then this complete moving picture data is transmitted to the second mobile terminal.

In accordance with the third aspect of the present invention, whether to generate complete moving picture data in advance or in response to a moving picture request from the second mobile terminal is decided based upon the difference moving picture data that has been transmitted from the first mobile terminal. In a case where rapid display of a moving picture takes precedence, complete moving picture data can be generated in advance. In a case where a reduction in the capacity of the storage device that stores moving picture data takes precedence, complete moving picture data can be generated in response to a moving picture response. Thus, complete moving picture data can be generated appropriately in accordance with the circumstances.

It may be so arranged that in a case where the difference moving picture data represents a difference moving picture that includes frames of complete still pictures at a ratio of one frame per plurality of frames, complete moving picture data is generated by extracting data representing the complete still pictures from the difference moving picture data. This makes it possible to generate complete moving picture data rapidly since processing for generating one complete frame from difference data is unnecessary.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram illustrating an overview of complete moving picture data;

DESCRIPTION OF THE PREFERRED EMBODIMENTS

Preferred embodiments of the present invention will now be described in detail with reference to the accompanying drawings.

Difference moving picture data (moving picture data that is based upon an MPEG scheme or the like) and complete moving picture data (moving picture data compliant with animated GIF or the like) will be described first.

Figure 1:
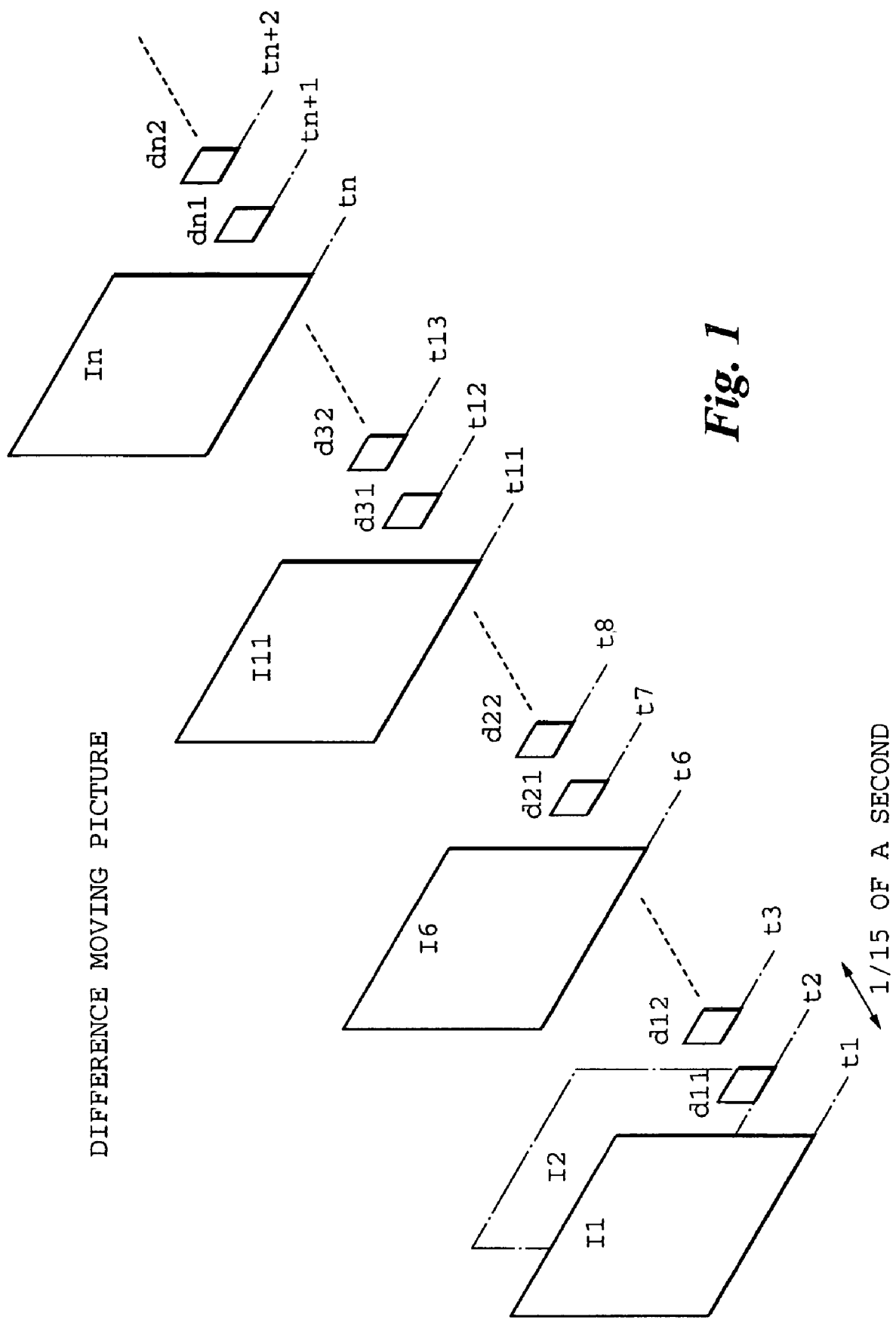
FIG. 1 is a diagram illustrating an overview of difference moving picture data.

FIG. 1 is a diagram useful in describing difference moving picture data.

An image representing the image of a subject that is the result of imaging the subject at a period of, e.g., 1/15 of a second, is obtained at the period of 1/15 of a second. Difference moving picture data contains image data representing single-frame complete still pictures (I1, I6, I11, . . . , In, etc., obtained at times t1, t6, t11, . . . , tn, etc., in FIG. 1) at a ratio of one frame per plurality of frames (five frames in FIG. 1). The difference moving picture data includes data (d11, d12, d31, d32, etc., obtained at times t2, t3, t12, t13, t21, t22, etc., in FIG. 1) representing a difference in motion between a frame in the plurality of frames and the immediately preceding frame. From one frame of a complete still picture (e.g., still picture I1 at time t1) and the difference data that follows this complete still picture (e.g., the difference data d11 at time t2), the still picture of the frame that follows the one frame of the complete still picture is restored (i.e., the still picture I2 at time t2 is restored). In a case where a moving picture data is displayed in difference moving picture data, processing for restoring a still picture is required (namely processing for restoring complete moving picture data). In a case where difference moving picture data is recorded, data representing one frame of a complete still picture is recorded at a ratio of one frame per plurality of frames, and difference data representing a difference in motion relative to the preceding frame is recorded with regard to frames between single frames of complete still pictures. A small storage capacity, therefore, will suffice.

FIG. 2 is a diagram useful in describing complete moving picture data.

In a manner similar to that of the case where difference moving picture data is obtained as described above, an image representing the image of a subject that is the result of imaging the subject at a period of, e.g., 1/15 of a second, is obtained at the period of 1/15 of a second. Complete moving picture data contains image data representing still pictures each individual frame of which is complete, the frames corresponding to the imaging period. For example, still pictures I1, I2, I3, . . . , In, etc., each of which is a single complete frame are obtained in correspondence with the times t1, t2, t3, . . . , tn, etc., of the period of 1/15 of a second. A moving picture is obtained by reproducing the still pictures I1, I2, I3, . . . , In, etc., in conformity with the imaging period. Unlike the difference moving picture data, complete moving picture data does not require processing for restoring still pictures.

Figure 3:
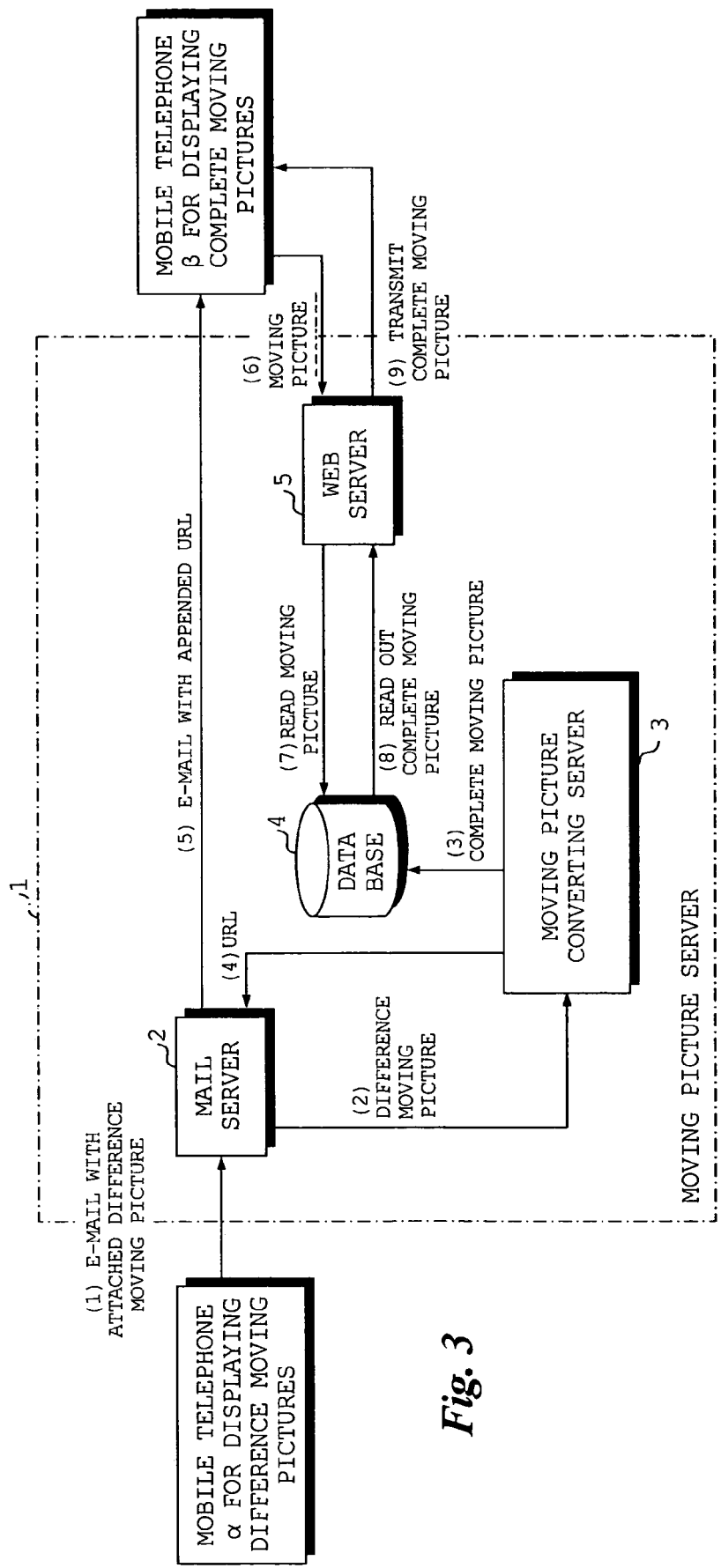
FIG. 3 is a block diagram illustrating the general configuration of a moving picture communication system according to a first embodiment of the present invention.

FIG. 3 illustrates the configuration of a moving picture communication system according to this embodiment.

The moving picture communication system according to this embodiment includes a mobile telephone α for displaying difference moving pictures, namely a mobile telephone capable of reproducing a moving picture represented by difference moving picture data; a moving picture server 1; and a mobile telephone β for displaying complete moving pictures, namely a mobile telephone capable of reproducing a moving picture represented by complete moving picture data. It is so arranged that if e-mail to which difference moving picture data has been attached is transmitted from the mobile telephone α for difference moving pictures to the mobile telephone β for complete moving pictures, then the mobile telephone β is capable of reproducing a moving picture represented by the difference moving picture data. It goes without saying that both mobile telephones α and β are each provided with a display screen.

The e-mail with the attached difference moving picture data is transmitted from the mobile telephone α to the moving picture server 1. When the difference moving picture data is received, the moving picture server 1 responds to receipt of the data by generating complete moving picture data and storing it in a database 4, described later. In response to a moving picture request from the mobile telephone β, the moving picture server 1 transmits the stored complete moving picture data to the mobile telephone β. Thus, when difference moving picture data is received, complete moving picture data is generated and stored in response to receipt of the data. If a moving picture request is issued from the mobile telephone β, therefore, the complete moving picture data can be transmitted to the mobile telephone β immediately.

First, e-mail to which difference moving picture data (a difference moving picture file) has been attached is transmitted from the mobile telephone α for difference moving pictures toward the mobile telephone β for complete moving pictures. When this occurs, the e-mail is received by a mail server 2 constituting the moving picture server 1.

Figure 4:
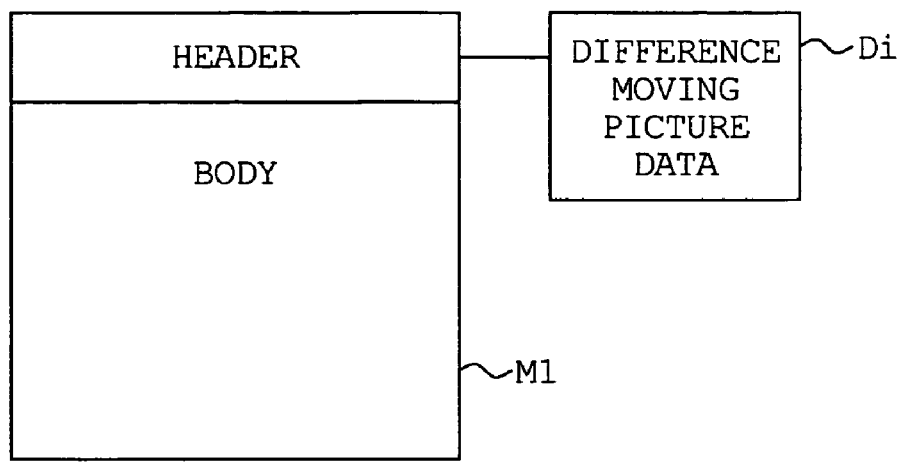
FIG. 4 is a diagram illustrating the structure of e-mail to which a difference moving picture has been attached.

FIG. 4 illustrates the structure of e-mail with an attached difference moving picture.

The e-mail with the attached difference moving picture consists of e-mail body M1 to which difference moving picture data (a difference moving picture file) Di has been attached. The e-mail body M1 includes a header recording area and a text recording area. E-mail management information (address of the transmission destination, address of the transmitting source, etc.) is recorded in the header recording area, and data representing text to be sent to the communication party (in this case the mobile telephone β for complete moving pictures) is recorded in the text recording area.

With reference again to FIG. 3, the difference moving picture data that has been attached to the e-mail is separated from the e-mail when the e-mail with the attached difference moving picture is received by the mail server 2. The difference moving picture data is transmitted from the mail server 2 to a moving picture converting server 3. The latter generates complete moving picture data from the difference moving picture data. It should readily be understood that the complete moving picture data can be generated from the data representing the complete single-frame still pictures included at a rate of one frame per plurality of frames, and the difference data in the manner described above. The generated complete moving picture data is applied to the database 4 to be stored at a location having a prescribed address.

Figure 5:
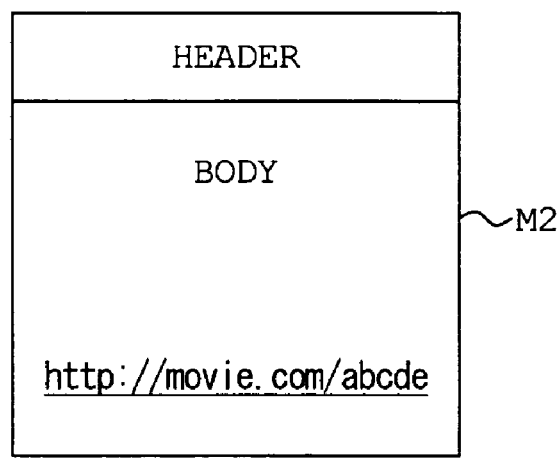
FIG. 5 is a diagram illustrating the structure of e-mail to which an URL link has been appended.

Further, when the difference moving picture data is separated from the e-mail, a URL (Uniform Resource Locator) indicating the address at which the complete moving picture data generated at set forth above has been stored in the database 4 is written in the text recording area of the e-mail body (see FIG. 5). The URL is written so as to become hot text. When e-mail with the appended URL link is thus generated, the generated e-mail with the appended URL link is transmitted from the mail server 2 to the mobile telephone β for complete moving pictures.

When the e-mail with the appended URL link transmitted from the mail server 2 of the moving picture server 1 is received by the mobile telephone β, the content of the text in the body of the e-mail is displayed on the display screen. Accordingly, the URL that was written at the mail server 2 is displayed in the form of hot text on the display screen of the mobile telephone β. If the URL being displayed on the display screen is clicked by the user of the mobile telephone β, then a request (moving picture request) for the moving picture data that has been stored at the address specified by the URL is generated and transmitted to a web server 5 that constitutes the moving picture server 1.

When the moving picture request is received by the web server 5, the moving picture data (in this case the complete moving picture data that has been generated) that has been stored at the address specified by the moving picture request is read from the database 4. When the complete moving picture data is read at the web server 5, the complete moving picture data thus read is transmitted to the mobile telephone β.

Owing to receipt of the complete moving picture data at the mobile telephone β for complete moving pictures, the moving picture represented by the difference moving picture data attached to the e-mail transmitted from the mobile telephone α for difference moving pictures is displayed on the display screen of the mobile telephone β.

Figure 6:
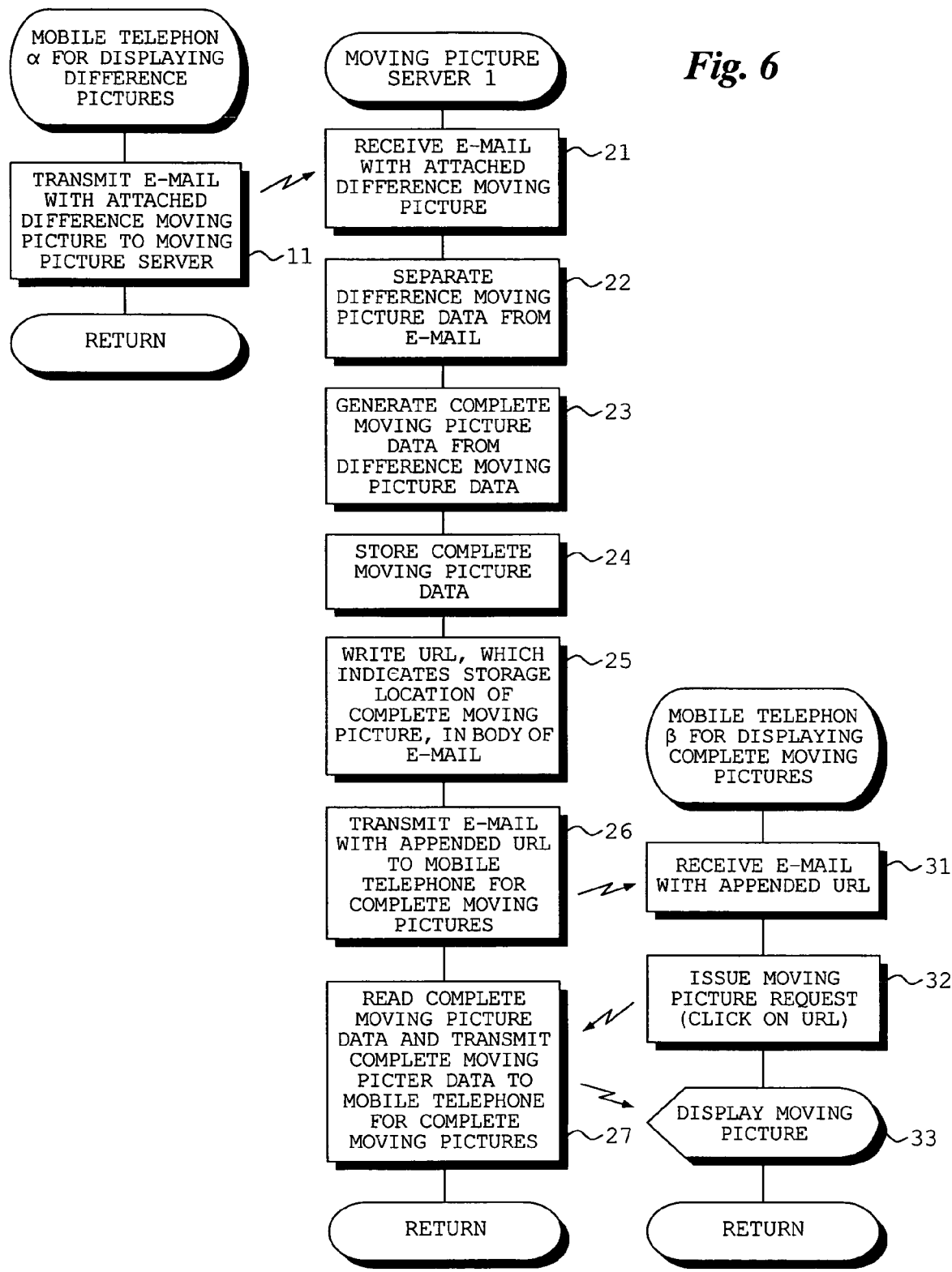
FIG. 6 is a flowchart illustrating processing executed by the moving picture communication system according to the first embodiment.

FIG. 6 is a flowchart illustrating processing for communicating moving picture data. This processing is for generating complete moving picture data in advance, in the manner described above, in a case where e-mail to which difference moving picture data has been attached has been transmitted from the mobile telephone α for difference moving pictures.

E-mail with attached difference moving picture data is transmitted from the mobile telephone α to the moving picture server 1 (step 11).

When the e-mail with the attached difference moving picture transmitted from the mobile telephone a is received at the moving picture server 1 (step 21), the difference moving picture data is separated from e-mail (step S22). Complete moving picture data is generated from the obtained difference moving picture data (step 23) and the generated complete moving picture data is stored (step 24). The URL indicating the location at which the complete moving picture data has been stored is written in the text recording area of the body of the e-mail (step 25). The e-mail having the URL written in the text recording area is transmitted from the moving picture server 1 to the mobile telephone β for complete moving pictures (step 26).

When the e-mail that has been transmitted from the moving picture server 1 is received at the mobile telephone β (step 31), the URL is displayed in the form of hot text on the display screen of the mobile telephone β. If the URL is clicked by the user, a moving picture request is generated and the request is transmitted to the moving picture server 1 along with the data indicating the URL (step 32).

When the moving picture request and data indicating the URL are received at the moving picture server 1, the complete moving picture data that has been stored at the location specified by the URL represented by the data indicating the URL is read. The read complete moving picture data is transmitted from the moving picture server 1 to the mobile telephone β (step 27).

Owing to receipt of the complete moving picture data at the mobile telephone β for complete moving pictures, the moving picture represented by the difference moving picture data attached to the e-mail transmitted from the mobile telephone α for difference moving pictures is displayed on the display screen of the mobile telephone β.

Figure 7:
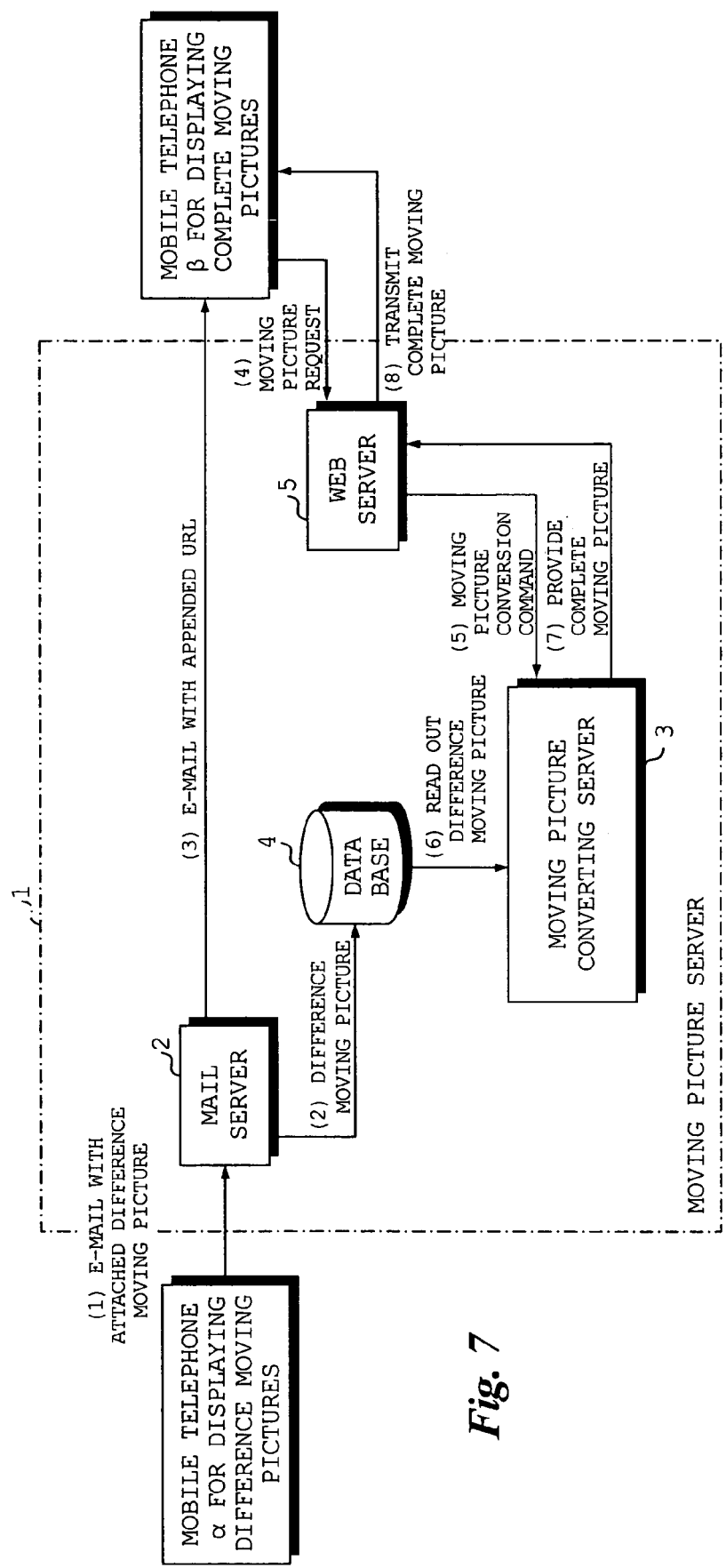
FIG. 7 is a block diagram illustrating the general configuration of a moving picture communication system according to a second embodiment of the present invention.
Figure 8:
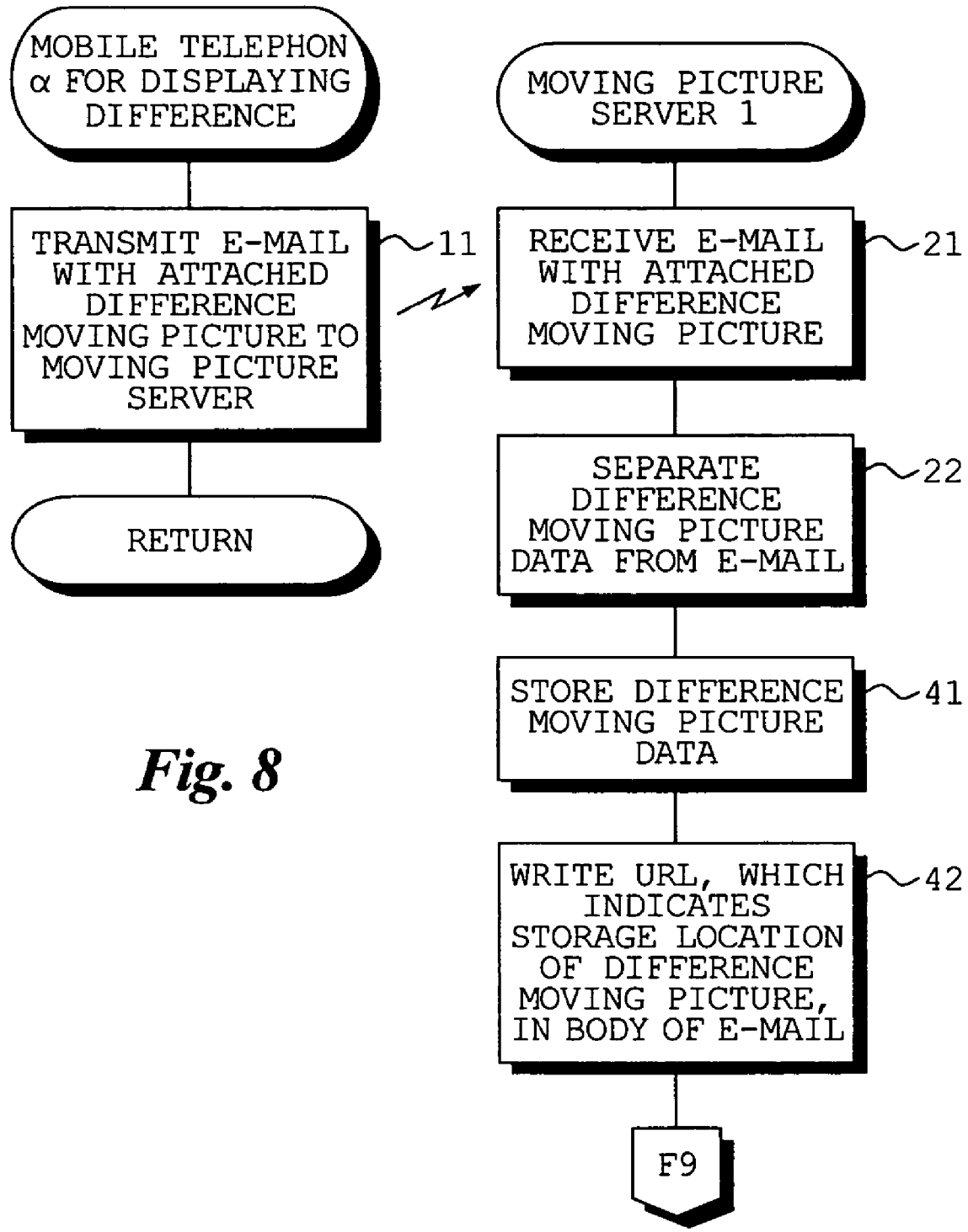
FIGS. 8 and 9 are flowcharts illustrating processing executed by the moving picture communication system according to the second embodiment.
Figure 9:
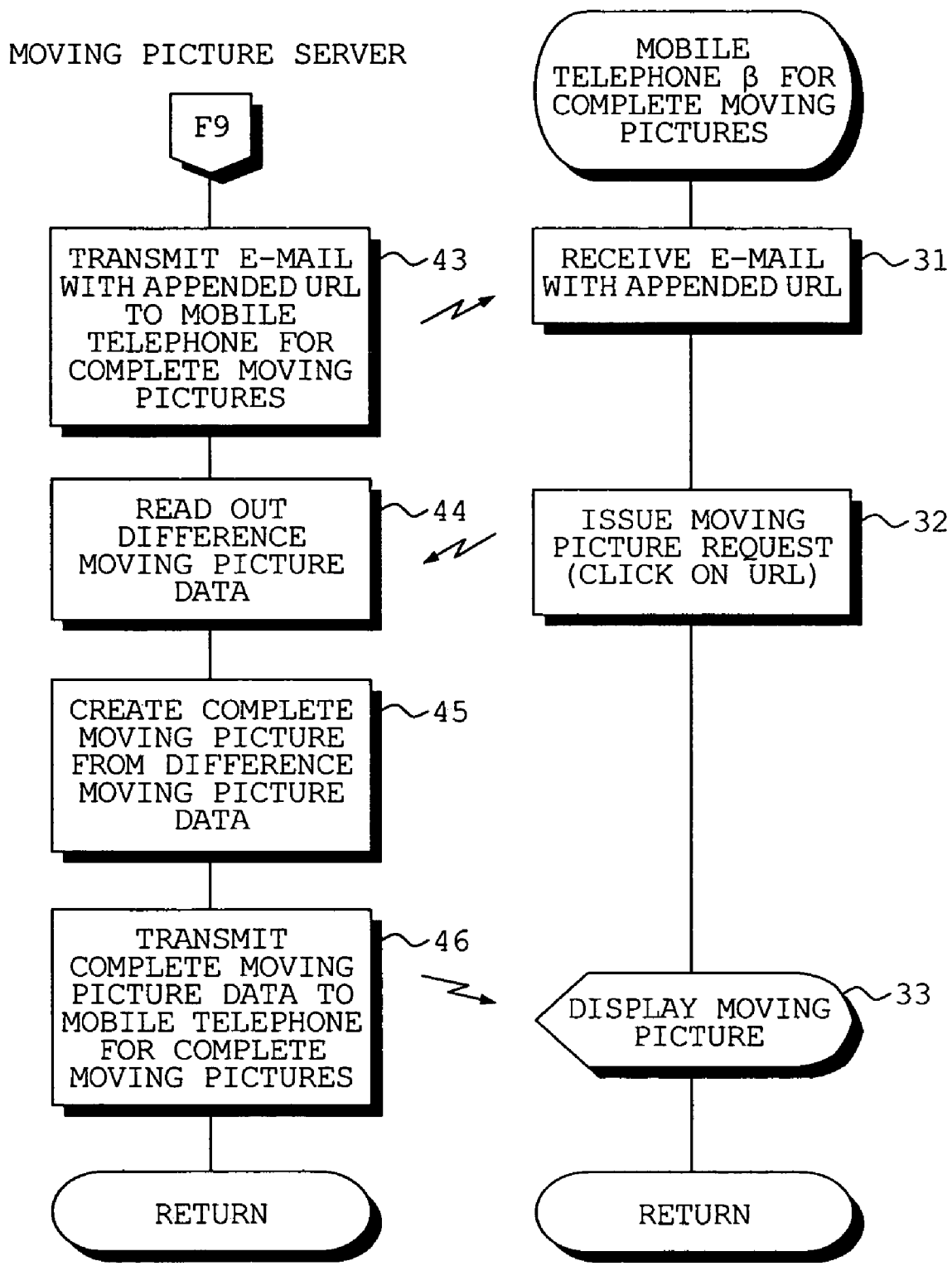

FIGS. 7 to 9 illustrate a second embodiment of the present invention.

FIG. 7 illustrates the configuration of the moving picture communication system, and FIGS. 8 and 9 are flowcharts illustrating the processing for communicating moving pictures. Components and processing identical with those in FIGS. 3 and 6 are designated by like reference numerals and step numbers, respectively.

In the first embodiment described above, complete moving picture data is generated in advance from difference moving picture data if e-mail to which the difference moving picture data has been attached is transmitted from the mobile telephone α for difference moving pictures to the moving picture server 1. By contrast, the second embodiment is such that complete moving picture data is generated from difference moving picture data in response to a moving picture request from the mobile telephone β for difference moving pictures.

When e-mail with an attached difference moving picture that has been transmitted from the mobile telephone α is received at the moving picture server 1 (steps 11, 21), in a manner similar to that described above, difference moving picture data is separated from the e-mail (step 22). The separated difference moving picture data is provided to and stored in the database 4 from the mail server 2 (step 41). Further, the URL indicating the storage location of the difference moving picture data is written in the text recording area of the e-mail from which the difference moving picture data has been separated (step 42). The e-mail with the appended URL link is transmitted from the mail server 2 to the mobile telephone β for difference moving pictures (step 43).

When the e-mail with the URL link is received at the mobile telephone β (step 31), the URL is displayed on the display screen of the mobile telephone β. If the URL is clicked by the user (step 32), then a moving picture request and the data indicating the URL are transmitted to the web server 5.

When the moving picture request and the data indicating the URL are received at the web server 5, the latter applies a moving picture conversion command to the moving picture converting server 3. When this occurs, the difference moving picture data that has been stored at the location of the URL specified by the data indicating the URL is read out of the database 4 by the moving picture converting server 3 (step 44). Complete moving picture data is generated from the difference moving picture data that has been read out (step 45). The generated complete moving picture data is applied from the moving picture converting server 3 to the web server 5, whence the data is transmitted to the mobile telephone β (step 46).

The moving picture represented by the difference moving picture data that has been transmitted from the mobile telephone α is displayed on the display screen of the mobile telephone β (step 33).

The complete moving picture data need not necessarily be generated until a moving picture request is issued by the mobile telephone β. Since the complete moving picture data usually involves a greater quantity of data than the difference moving picture data, the database 4 in which the difference moving picture data is stored beforehand need only have a small capacity. It goes without saying that it may be so arranged that the generated complete moving picture data is stored in the database 4.

FIGS. 10 to 13 illustrate a third embodiment of the present invention.

Figure 10:
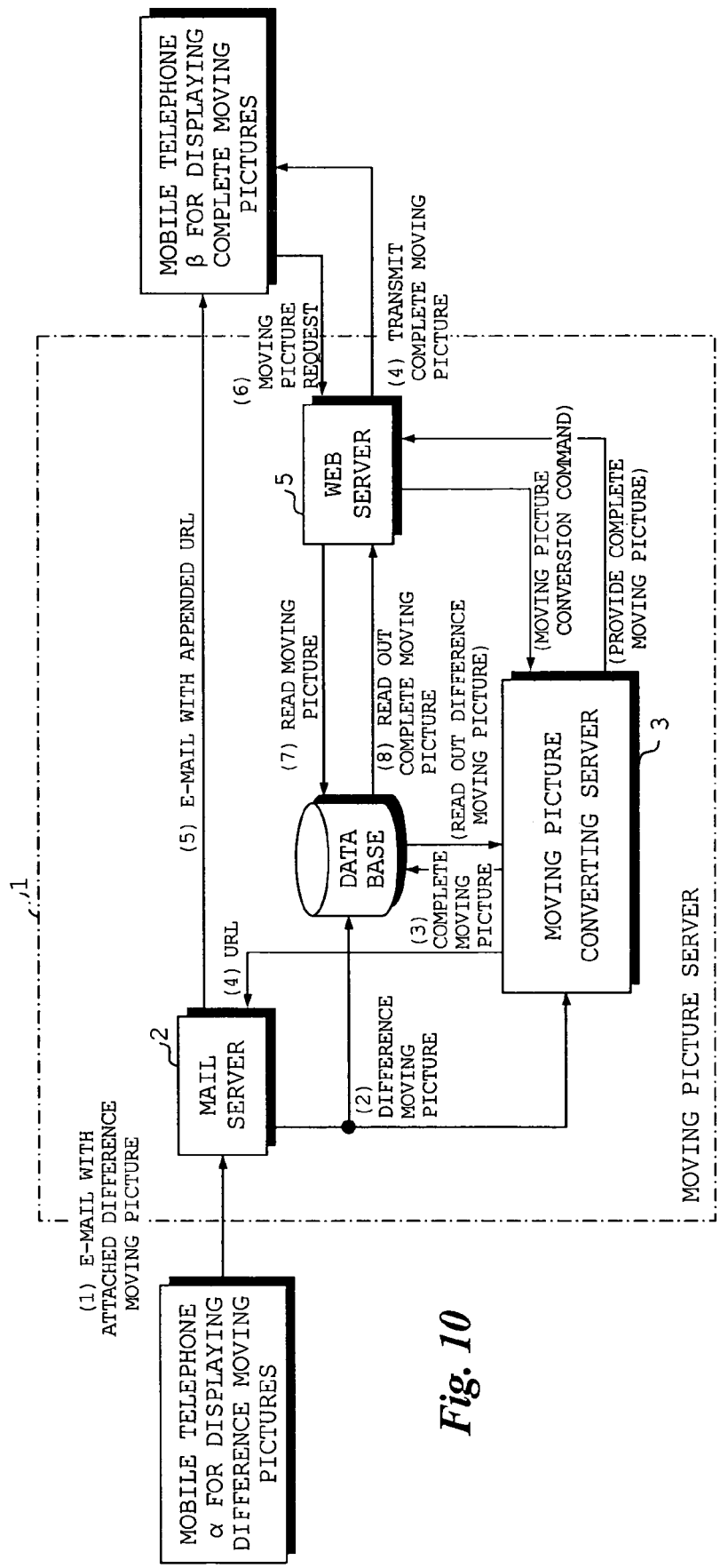
FIG. 10 is a block diagram illustrating the general configuration of a moving picture communication system according to a third embodiment of the present invention.
Figure 11:
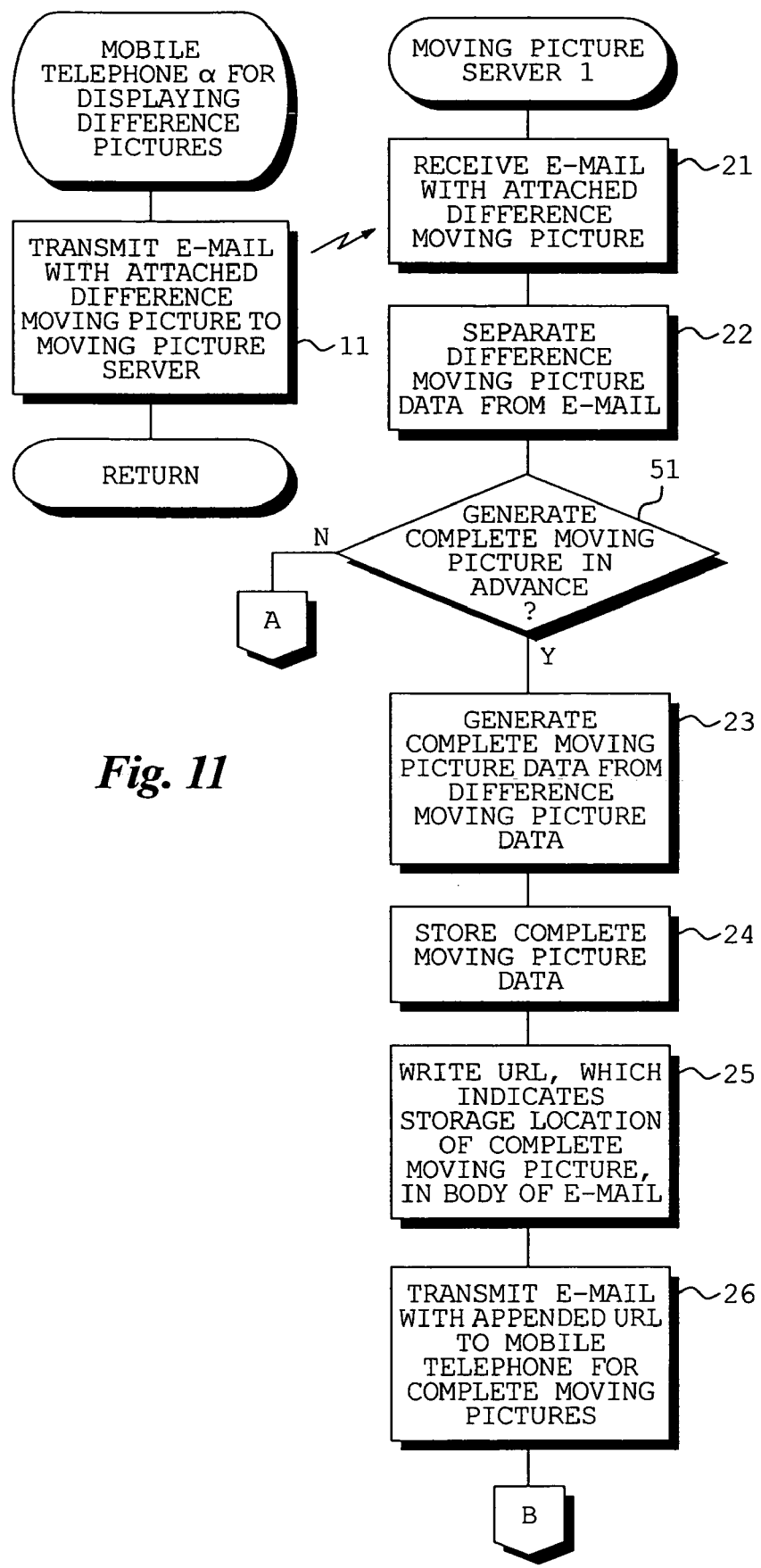
FIGS. 11 to 13 are flowcharts illustrating processing executed by the moving picture communication system according to the third embodiment.
Figure 12:
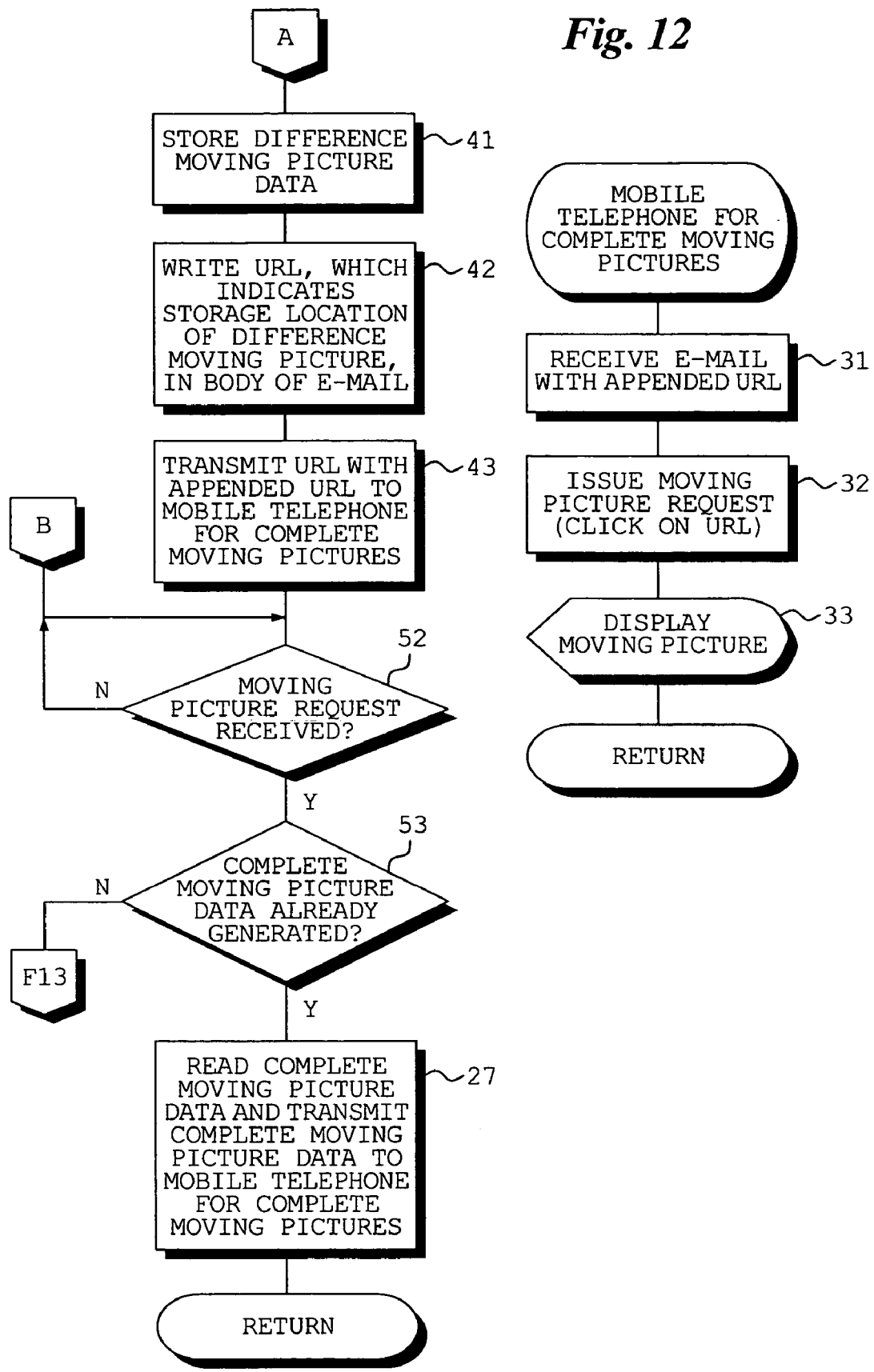
Figure 13:
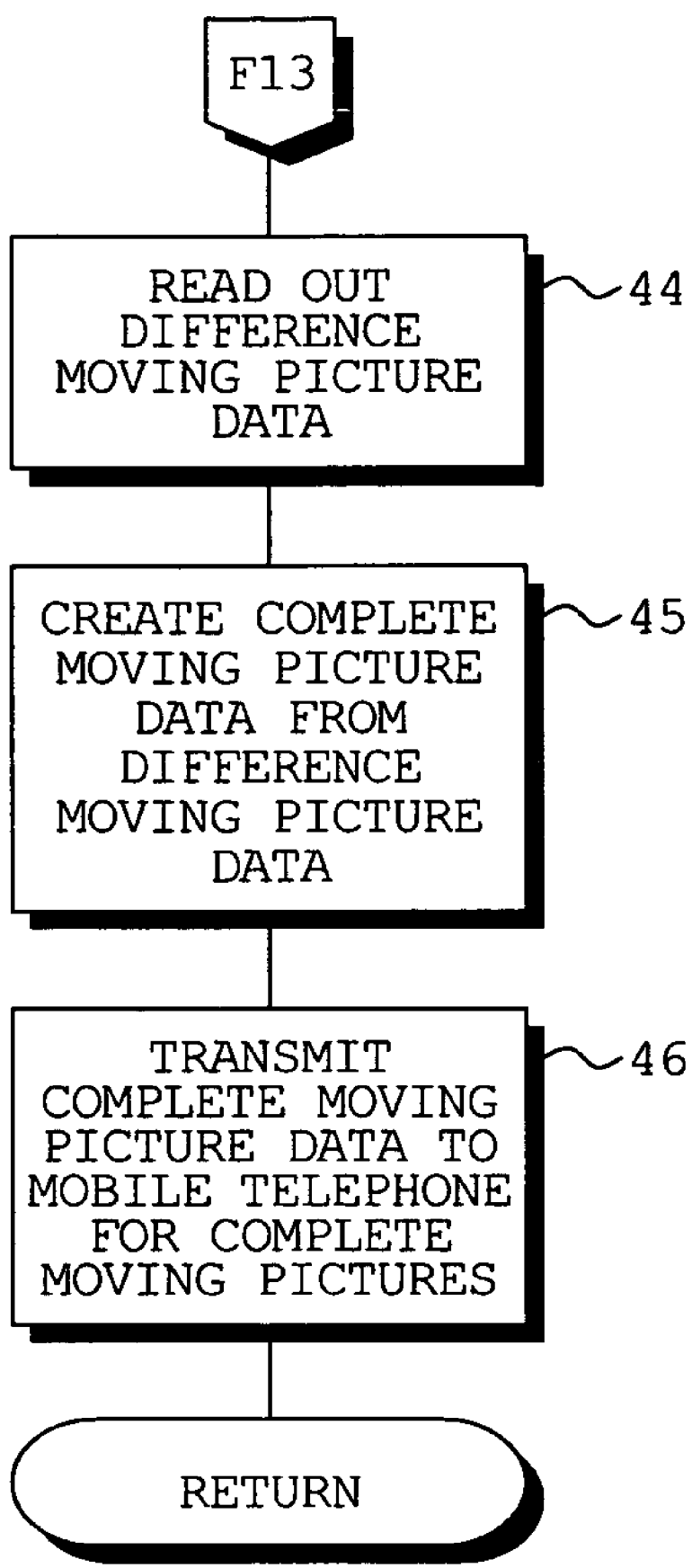

FIG. 10 illustrates the configuration of the moving picture communication system, and FIGS. 11 to 13 are flowcharts illustrating the processing for communicating moving pictures. Components and processing identical with those in FIGS. 3 and 6 are designated by like reference numerals and step numbers, respectively.

In this embodiment, complete moving picture data is generated if the time required to convert difference moving picture data, which has been transmitted from the mobile telephone α, to the complete moving picture data is shorter than a prescribed length time (i.e., if the amount of difference moving picture data is small). If the time required to convert difference moving picture data to complete moving picture data is longer than the prescribed length of time (i.e., if the amount of difference moving picture data is large), then complete moving picture data is generated from the difference moving picture data in response to a moving picture request from the mobile telephone β.

When e-mail with an attached difference moving picture transmitted from the mobile telephone α is received at the moving picture server 1 (step 21 in FIG. 11), the difference moving picture data is separated from e-mail (step S22 in FIG. 11). On the basis of the separated difference moving picture data, it is determined whether complete moving picture data is to be generated in advance (step 51 in FIG. 11). If more than a prescribed length of time is required to generate the complete moving picture data (this length of time can be determined freely), then the complete moving picture data is generated in advance. If the complete moving picture data can be generated in less than the prescribed length of time, then the complete moving picture data is generated in response to a moving picture request from the mobile telephone β.

In a case where the complete moving picture data is generated in advance ("YES" at step 51 in FIG. 11), the separated difference moving picture data is transmitted from the mail server 2 to the moving picture converting server 3 in the manner described above. Complete moving picture is generated from the difference moving picture data at the moving picture converting server 3 (step 23 in FIG. 11) and the generated complete moving picture data is stored in the database 4 (step 24 in FIG. 11). The URL indicating the storage location of the complete moving picture data is recorded in the text recording area of the e-mail by the mail server 2 and the e-mail with the appended URL link is transmitted from the mail server 2 to the mobile telephone β (step 26 in FIG. 11).

In a case where the complete moving picture data is not generated in advance ("NO" at step 51 in FIG. 11), the separated difference moving picture data is stored in the database 4 (step 41). The e-mail with the appended URL link in which the URL indicating the storage location of the difference moving picture data has been written is transmitted from the mail server 2 to the mobile telephone β (steps 42, 43 in FIG. 12).

When a moving picture request from the mobile telephone β that has received the e-mail with the appended URL link is received at the web server 5 (steps 31, 32 in FIG. 12; "YES" at step 52), whether complete moving picture data of the moving picture that corresponds to the moving picture request has already been generated is checked (step 53 in FIG. 12).

If complete moving picture data has been generated ("YES" at step 53 in FIG. 12), then this generated complete moving picture data is read out of the database 4 and is transmitted to the mobile telephone B (step 27 in FIG. 12).

If complete moving picture data has not been generated ("NO" at step 53 in FIG. 12), then difference moving picture data is read out of the database 4 and is applied to the moving picture converting server 3, which proceeds to generate complete moving picture data from the difference moving picture data (step 45 in FIG. 13). The generated complete moving picture data is transmitted to the mobile telephone β by the web server 5 (step 46 in FIG. 12).

Owing to receipt of the complete moving picture data, which has been transmitted from the moving picture server 1, at the mobile telephone β for complete moving pictures, the moving picture represented by the difference moving picture data that has been transmitted from the mobile telephone α for difference pictures is displayed on the display screen of the mobile telephone β (step 33 in FIG. 12).

Since difference moving picture data for which the generation of complete moving picture data would take time is converted to complete moving picture data in advance and stored, a database 4 of comparatively small storage capacity can be utilized efficiently. In addition, complete moving picture data can be transmitted to the mobile telephone β for complete moving pictures immediately in response to a moving picture request from the mobile telephone β.

Although mobile telephones are utilized in the above-described embodiment, the present invention is also applicable to mobile terminals of the kind capable of sending and receiving e-mail, such as PDAs.

As many apparently widely different embodiments of the present invention can be made without departing from the spirit and scope thereof, it is to be understood that the invention is not limited to the specific embodiments thereof except as defined in the appended claims.

What is claimed is:

1. A moving picture server, comprising:
    a generating device, which responds to receipt of e-mail transmitted from a first mobile terminal to a second mobile terminal and to which difference moving picture data is attached, for executing processing that generates complete moving picture data from the difference moving picture data, and processing that generates e-mail to which is appended an address indicating a location at which the generated complete moving picture data is stored;
    a complete moving picture data storage controller for controlling a complete moving picture data storage device and with the complete moving picture data generated by the generating device being stored at a location specified by the address;
    an e-mail transmitting device for transmitting the e-mail with the appended address generated by said generating device to the second mobile terminal; and
    a complete moving picture data transmitting device, which responds to a moving picture request transmitted from the second mobile terminal in response to receipt at the second mobile terminal of the e-mail with the address that is transmitted from said e-mail transmitting device, for transmitting the complete moving picture data, which is stored at the location of said complete moving picture data storage device specified by the address, to the second mobile terminal.

2. A moving picture server, comprising:
    an e-mail generating device for receiving e-mail transmitted from a first mobile terminal to a second mobile terminal and to which difference moving picture data is attached, and generating e-mail to which is appended an address indicating a location at which the difference moving picture data will be stored;

a difference moving picture data storage controller for controlling a difference moving picture data storage device and with the difference moving picture data that has been attached to the received e-mail being stored at a location specified by the address;

an e-mail transmitting device for transmitting the e-mail with the appended address generated by said e-mail generating device to the second mobile terminal;

a complete moving picture data generating device, which responds to a moving picture request transmitted from the second mobile terminal in response to receipt at the second mobile terminal of the e-mail with the address that is transmitted from said e-mail transmitting device, for generating complete moving picture data from the difference moving picture data that is stored at the location of said difference moving picture data storage device specified by the address; and a complete moving picture data transmitting device for transmitting the complete moving picture data, which is generated by said complete moving picture data generating device, to the second mobile terminal.

3. A moving picture server, comprising:

a generation-timing decision device for receiving e-mail transmitted from a first mobile terminal to a second mobile terminal and to which difference moving picture data is attached, and deciding, based upon the received difference moving picture data, whether to generate complete moving picture data from the difference moving picture data in advance or when a moving picture request transmitted from the second mobile terminal is received;

a moving picture data storage controller, which is responsive to a decision by said generation-timing decision device to the effect that the complete moving picture data is to be generated from the difference moving picture data in advance, for generating the complete moving picture data from the received difference moving picture data and storing the generated complete moving picture data at a location of a moving picture data storage device that has a specific address, and which is responsive to a decision by said generation-timing decision device to the effect that the complete moving picture data is to be generated from the difference moving picture data when the moving picture request is received, for storing the received difference moving picture data at a location of the moving picture data storage device that has a specific address;

an e-mail generating device for generating e-mail to which is appended an address indicating a location of the moving picture data storage device at which the difference moving picture data or complete moving picture data is stored;

an e-mail transmitting device for transmitting the e-mail with the appended address generated by said e-mail generating device to the second mobile terminal; and a moving picture data transmitting device, which responds to a moving picture request transmitted from the second mobile terminal in response to receipt at the second mobile terminal of the e-mail with the address that is transmitted from said e-mail transmitting device, for creating complete moving picture data from difference moving picture data and transmitting the complete moving picture data to the second mobile terminal if the moving picture data that is stored at the location of the moving picture data storage device specified by the address is the difference moving picture data for creating complete moving picture data, and transmitting complete moving picture data to the second mobile terminal if the moving picture data that is stored at the location of the moving picture data storage device specified by the address is the complete moving picture data.

4. The moving picture serve according to claim 1, wherein the difference moving picture data represents a difference moving picture that includes frames of complete still picture at a ratio one frame per plurality of frame; and the complete moving picture data is generated by extracting data representing the complete still picture from the difference moving picture data.

5. A method of controlling a moving picture server, comprising the steps of:

in response to receipt of e-mail transmitted from a first mobile terminal to second mobile terminal and to which difference moving picture data is attached, executing processing that generates complete moving picture data from the difference moving picture data, and processing that generates e-mail to which is appended an address indicating a location at which the generated complete moving picture data will be stored;

controlling a complete moving picture data storage device and with the generated complete moving picture data being stored at a location specified by the address;

transmitting the generated e-mail with the appended address to the second mobile terminal; and in response to a moving picture request transmitted from the second mobile terminal in response to receipt at the second mobile terminal of the e-mail with the address that is transmitted, transmitting the complete moving picture data, which is stored at the location of the complete moving picture data storage device specified by the address, to the second mobile terminal.

6. A method of controlling a moving picture server, comprising the steps of:

receiving e-mail transmitted from a first mobile terminal to a second mobile terminal and to which difference moving picture data is attached, and generating e-mail to which is appended an address indicating a location at which the difference moving picture data will be stored;

controlling a difference moving picture data storage device and with the difference moving picture data that is attached to the received e-mail being stored at a location specified by the address;

transmitting the generated e-mail with the appended address to the second mobile terminal;

in response to a moving picture request transmitted from the second mobile terminal in response to receipt at the second mobile terminal of the transmitted e-mail with the address, generating complete moving picture data from the difference moving picture data that is stored at the location of the difference moving picture data storage device specified by the address; and transmitting the generated complete moving picture data to the second mobile terminal.

7. A method of controlling a moving picture server, comprising the steps of:

receiving e-mail transmitted from a first mobile terminal to a second mobile terminal and to which difference moving picture data is attached, and deciding, based upon the received difference moving picture data, whether to generate complete moving picture data from the difference moving picture data in advance or when a moving picture request transmitted from the second mobile terminal is received;

generating, in response to a decision to the effect that the complete moving picture data is to be generated from the difference moving picture data in advance, the complete moving picture data from the received difference moving picture data and storing the generated complete moving picture data at a location of a moving picture data storage device that has a specific address, and storing, in response to a decision to the effect that the Complete moving picture data is to be generated from the difference moving picture data when the moving picture request is received, the received difference moving picture data at a location of the moving picture data storage device that has a specific address;

generating e-mail to which is appended an address indicating a location of the moving picture data storage device at which the difference moving picture data or complete moving picture data is stored;

transmitting the generated e-mail with the appended address to the second mobile terminal; and in response to a moving picture request transmitted from the second mobile terminal in response to receipt at the second mobile terminal of the transmitted e-mail with the address, creating complete moving picture data from difference moving picture data and transmitting the complete moving picture data to the second mobile terminal if the moving picture data that is stored at the location of the moving picture data storage device specified by the address is the difference moving picture data, for creating complete moving picture data, and transmitting complete moving picture data to the second mobile terminal if the moving picture data that is stored at the location of the moving picture data storage device specified by the address is the complete moving picture data.

* * * * *